United States Patent
Gruszka et al.

(10) Patent No.: US 9,667,951 B2
(45) Date of Patent: May 30, 2017

(54) THREE-DIMENSIONAL TELEVISION CALIBRATION

(71) Applicant: Cisco Technology Inc., San Jose, CA (US)

(72) Inventors: Thierry Gruszka, Le Raincy (FR); Damien Alliez, Noizay (FR)

(73) Assignee: Cisco Technology, Inc., San Jose, CA (US)

( * ) Notice: Subject to any disclaimer, the term of this patent is extended or adjusted under 35 U.S.C. 154(b) by 508 days.

(21) Appl. No.: 14/182,671

(22) Filed: Feb. 18, 2014

(65) Prior Publication Data

US 2015/0237335 A1 Aug. 20, 2015

(51) Int. Cl.
*H04N 13/00* (2006.01)
*H04N 13/04* (2006.01)

(52) U.S. Cl.
CPC ..... *H04N 13/0425* (2013.01); *H04N 13/0022* (2013.01)

(58) Field of Classification Search
CPC ....................... H04N 13/0022; H04N 13/0425
See application file for complete search history.

(56) References Cited

U.S. PATENT DOCUMENTS

| | | | |
|---|---|---|---|
| 6,011,581 A | 1/2000 | Swift et al. | |
| 7,538,876 B2 | 5/2009 | Hewitt et al. | |
| 8,287,127 B2 * | 10/2012 | Gao | G02B 27/225 353/7 |
| 9,049,425 B2 * | 6/2015 | Song | H04N 13/0022 |
| 9,081,181 B2 * | 7/2015 | Lee | G02B 27/017 |
| 9,172,939 B2 * | 10/2015 | Corral-Soto | H04N 13/0011 |
| 9,383,587 B2 * | 7/2016 | Balogh | G02B 5/0257 |
| 9,445,084 B2 * | 9/2016 | Shikata | H04N 13/0497 |
| 2005/0253924 A1 * | 11/2005 | Mashitani | H04N 13/0275 348/42 |
| 2005/0275914 A1 | 12/2005 | Vesely et al. | |
| 2010/0220175 A1 * | 9/2010 | Claydon | H04N 9/8715 348/43 |
| 2010/0220325 A1 | 9/2010 | Otte et al. | |

FOREIGN PATENT DOCUMENTS

| | | |
|---|---|---|
| EP | 1 489 857 A1 | 12/2004 |
| GB | 2 404 106 A | 1/2005 |
| GB | 2479784 A | 10/2011 |

\* cited by examiner

*Primary Examiner* — Nhon Diep (74) *Attorney, Agent, or Firm* — Samuel M. Katz (57) ABSTRACT

In one embodiment, a method includes displaying a test pattern on a display device associated with a client device, the test pattern comprising a stereoscopic image having first and second images and depth characteristics associated with an offset between the first and second images; adjusting the offset between the first and second images in response to inputs received from a user of the client device viewing said stereoscopic image from at least one viewing position; and storing the adjusted offset in a storage device.

7 Claims, 5 Drawing Sheets

THREE-DIMENSIONAL TELEVISION CALIBRATION

TECHNICAL FIELD

The present invention relates to methods and apparatus for calibrating three-dimensional television systems.

BACKGROUND

Display technologies are integral to most electronic devices, being used both for watching media such as television (TV) programs and for graphical user interfaces (UIs) for computers, mobile phones and other electronic devices. In recent years, the use of three-dimensional (3D) technology in such displays has been gathering momentum in particular in the TV broadcasting industry. The basic technology behind 3D imaging is well-known. 3D moving images have also been used for many years, but have not yet been utilized as much in consumer electronic devices.

3D imaging works by tricking the eye into perceiving depth information through two or more images. There are various established techniques for achieving this, the most popular of which utilize two images and are called stereoscopic imaging techniques. Stereoscopic imaging techniques utilized for moving images such as TV involve displaying each image to be viewed by the viewer as two images: one image is arranged to be viewed by the right eye and another one is arranged to be viewed by the left eye. The left and right images differ slightly such that when they reach each eye the viewer can extract depth information from the images. Each portion of the left and right images contains views of objects that are captured from subtly different perspectives. As a result, the offset of the views differs by a certain number of pixels, in accordance with the depth to be perceived by the viewer.

DESCRIPTION OF EXAMPLE EMBODIMENTS

Overview

In one embodiment, a method includes displaying a test pattern on a display device associated with a client device, the test pattern comprising a stereoscopic image having first and second images and depth characteristics associated with an offset between the first and second images; adjusting the offset between the first and second images in response to inputs received from a user of the client device viewing said stereoscopic image from at least one viewing position; and storing the adjusted offset in a storage device.

Example Embodiments

In the following description, numerous specific details are set forth in order to provide a thorough understanding of the various principles of the present invention. However, those skilled in the art will appreciate that not all these details are necessarily always required for practicing the present invention. In this instance, well-known circuits, control logic, and the details of computer program instructions for conventional algorithms and processes have not been shown in detail in order to not obscure the general concepts unnecessarily.

Although the principles of the present invention are largely described herein in relation to a television broadcast environment and related television applications, this is an example selected for convenience of presentation, and is not limiting.

For three-dimensional television (3D-TV) systems, the perception of 3D depends on a wide range of parameters including the TV display size, the viewing conditions and the audience characteristics. The 3D effect is usually determined according to a fixed image size captured and/or processed before transmission. Current 3D-TV systems propose different ways to adjust the 3D settings on a TV set in order to calibrate the 3D effect. However, all of them require the user to adjust the 3D settings by manually entering a plurality of parameters (e.g. the viewing distance, the screen size, etc.) via a control menu displayed on the TV screen or monitor. In some cases, the user also needs to take measurement(s) by hand of these different parameters prior to adjusting the 3D settings. Additionally, the calibration is usually done "on the fly" by using the TV program (e.g. TV broadcast program, recorded program, Video-On-Demand program, etc.) currently being rendered on the TV display screen without any consideration of whether or not this TV program is suitable for calibrating the stereoscopic effect. Even with these adjustments, the rendered 3D effect may not be adapted to the particular viewing conditions and audience characteristics thereby leading to a deceptive 3D experience.

Figure 1:
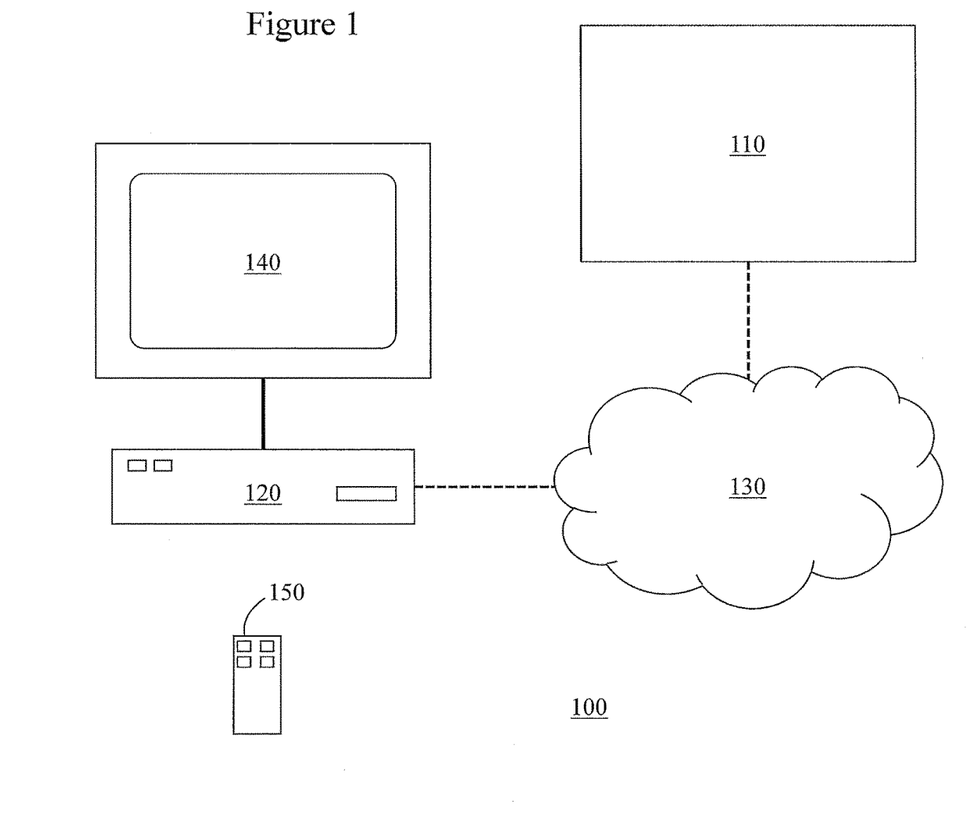
FIG. 1 is a simplified block diagram illustration of a three-dimensional television system constructed and operative in accordance with an embodiment of the present invention.

Reference is now made to FIG. 1, which is a simplified block diagram illustration of a three-dimensional television system constructed and operative in accordance with an embodiment of the present invention.

A headend 110 typically communicates with a plurality of client devices via a communications network 130. Additionally or alternatively, a plurality of headends communicates with a single client device 120 or with a plurality of client devices via the communications network 130. For simplicity of depiction and description, and without limiting the generality of the invention, only one client device 120 is illustrated in FIG. 1.

The communication network 130 is a one-way or two-way communication network that includes at least one of the following: a satellite based communication network; a cable based communication network; a conventional terrestrial broadcast television network; a telephony based communication network; a telephony based television broadcast network; a mobile-telephony based television broadcast network; an Internet Protocol (IP) television broadcast network;

and a computer based communication network. It is appreciated that in alternative embodiments, the communication network 130 may, for example, be implemented by a one-way or two-way hybrid communication network, such as a combination cable-telephone network, a combination satellite-telephone network, a combination satellite-computer based communication network, or by any other appropriate network. Other ways of implementing the communication network 130 will be apparent to someone skilled in the art.

The 3D-TV system 100 of FIG. 1 comprises a client device 120 disposed between a headend 110 and a display device 140. Client device 120 comprises a storage device, such as a hard disk or high capacity memory. Client device 120 is coupled to a display device 140. Client device 120 typically further comprises a tuner, a demultiplexer, a decoder, a descrambler, a receiver and a processor. It is appreciated that the client device 120 comprises standard hardware components and software components, as is well known in the art.

Client device 120 is typically connected in operation to display device 140 via a digital AV interface (e.g. HDMI, DVI, etc.) or via an analogue AV interface (e.g. component (RGB, YPbPr), composite (NTSC, PAL, SECAM), S-video, SCART, RF coaxial, D-Terminal (D-tanshi) etc.). While shown as separate entities in FIG. 1, the client device 120 may be integral with the display device 140 in other embodiments of the present invention.

Display device 140 is typically operated by a user, for example via a remote control unit (RCU) 150. Using a RCU 150, a user can interact with a User Interface (UI) or an Electronic Program Guide (EPG) displayed on the display device 140, select AV content to view, such as a live event broadcast, a Video-On-Demand (VOD) asset, a recorded event, etc. The operating system software within client device 120 monitors user interaction with display device 140 and/or client device 120 and maintains a database of service and event information. The operating system software enables the user to choose an event/service to view. The RCU 150 is operable to communicate with the receiver of the client device 120 using any suitable connectivity link (e.g. wireless connection over Internet Protocol). The RCU 150 may be, for example, but without limiting the generality of the invention, a traditional remote control, a laptop computer, a desktop or personal computer (PC), a tablet computer such as an iPad™, a mobile computing device, such as a Personal Digital Assistant (PDA), a mobile phone, or any suitable handheld device.

The headend 110 of the 3D-TV system 100 is further able to provide a stereoscopic 3D image stream in the form of a set of consecutive stereoscopic images to be transmitted to the client device 120. When broadcasting the 3D image stream, for example as part of television broadcast, the perception of depth that is associated with 3D images is achieved by a pair of similar two-dimensional (2D) images captured from slightly different perspectives and thus slightly offset from each other. The offset of the two images, which in turn determines the perceived depth of the image, is determined in accordance with a fixed image size before transmission. For example, the depth may be determined to be displayed on a 3D-TV set of a particular size. If the received 3D image stream is then displayed on a 3D-TV set of a different size, the image information will be scaled. Another 3D broadcasting technique consists in supplying a disparity map along with a 2D image stream. This disparity map or depth map (these expressions being used interchangeably) comprises information relating to the distance of the surfaces of scene objects from a viewpoint and typically comprises a set of values (e.g. one for each image pixel location) representing a pixel translation to apply to the 2D image stream in order to generate a further 2D image stream. The two 2D image streams would then combine to form a stereoscopic 3D image stream. The disparity map is useful in situations where scaling is needed since it is usually observed that the perceived depths are not scaled consistently. Therefore, having this disparity map enables the client device 120 to refine the 3D effect according to the display size of the 3D-TV set. The client device 120 then performs any processing required to display the received 3D image stream on the display device 140. This processing may include:

merely scaling the set of consecutive stereoscopic images (each stereoscopic image having left and right images provided by the headend 110) for display on the display device 140; or generating a 2D image stream using the disparity map and the initial 2D image stream provided by the headend 110 to produce a 3D image stream comprising a set of consecutive stereoscopic images and scaling the produced 3D image stream for display on the display device 140.

In an embodiment of the present invention, a user of such a 3D-TV system 100 is able to customize a pixel offset to be used to display the 3D image stream according to the viewing conditions and audience characteristics of a particular household during a calibration procedure. Typically, the customized pixel offset obtained during the calibration procedure is applied to the right and left images of a received 3D image stream (either the right and left images provided by the headend 110; or the right (respectively left) image provided by the headend 110 and the left (respectively right) image generated using the disparity map) at the time of display. The calibration procedure may be done either during the installation phase i.e. at a time when the user first installs his 3D-TV system 100 or at a later time automatically or on a per user request. Typically, the user is able to run a calibration application that may be locally executed on the client device 120. This calibration application is an interactive application that may be written in any suitable programming language (e.g. native, C/C++, Java, HTML, Flash, etc.) and may be enabled by various ecosystems (e.g. middleware, download, web browser, runtime engine, widget, application store, etc.) as long as it is operable to run on the client device 120. Also, the calibration application does not depend on the content itself and therefore may run for different types of 3D video content such as live broadcasts, VOD programs, BluRay, etc. Those skilled in the art will appreciate that the application may be launched by the user using an RCU 150 via a dedicated menu in the UI rendered on the display device 140. Then, the calibration application gives the user—wearing 3D glasses if necessary—the opportunity to adjust the pixel offset between first (e.g. Left) and second (e.g. right) images of a stereoscopic image through one or more interactive test patterns. The adjusted offset may then be stored on a storage device of the client device 120 and be used later to display the stereoscopic images of the 3D image stream. It will be apparent to someone skilled in the art, that such a calibration procedure may be repeated or updated as often as needed in response to a user's input or to a change in the viewing conditions and/or in the audience characteristics.

As explained hereinabove, the application typically enables a user to adjust the pixel offset between the first and second images of a stereoscopic image by reacting to/interacting with one or more interactive test patterns. This pixel offset is also known as the horizontal parallax. Calibrating the horizontal parallax has an influence on many stereoscopic parameters such as, for example, the intra-ocular distance, the parallax and the vergence.

The intra-ocular distance defines the distance between the viewer's eyes. It is apparent that this distance varies from one person to another. The solution adopted by the 3D industry to address this issue is to use average values for every representative group of people i.e. Adults, teenagers and children. The typical average value selected for an adult is 65 mm (the maximum accepted value being 73 mm) and 50 mm for a child. The intra-ocular distance applied in theaters is usually 63.5 mm in order to be representative of a maximum number of people.

Figure 2A:
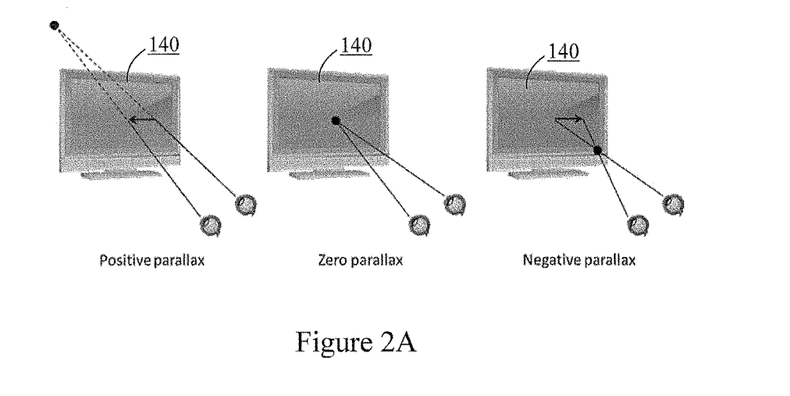
FIG. 2A is a descriptive illustration showing different parallax in accordance with an embodiment of the present invention.

The parallax expresses the offset between the apparent angles and positions of an object due to the distance between the eyes of the observer. Thus, the perceived 3D effect depends on both the amount and the type of parallax. There are three different types of parallax as shown in FIG. 2A:

Positive parallax for which corresponding image points are said to have positive (or uncrossed) parallax P when the point in the right eye view lies further to the right than the corresponding point in the left eye view. In such a situation, the related viewing rays converge at a 3D point so that the reproduced 3D scene is perceived behind the screen. In addition, it is to be noted that in a situation where the parallax P is equal to the viewer's intra-ocular distance, the 3D scene is reproduced at infinity. This also means that the allowed maximum value for the positive parallax is limited to the viewer's intra-ocular distance;

Zero parallax for which corresponding image points lie at the same position in the left and right eye views. The resulting 3D point is therefore observed on the screen plane. This situation is typically referred to as the Zero Parallax Setting (ZAPS); and Negative parallax for which corresponding image points are said to have negative (or crossed) parallax P when the point in the right eye view lies further to the left than the corresponding point in the left eye view. In such a situation, the related viewing rays converge at a 3D point so that the reproduced 3D scene is perceived in front of the screen.

Figure 2B:
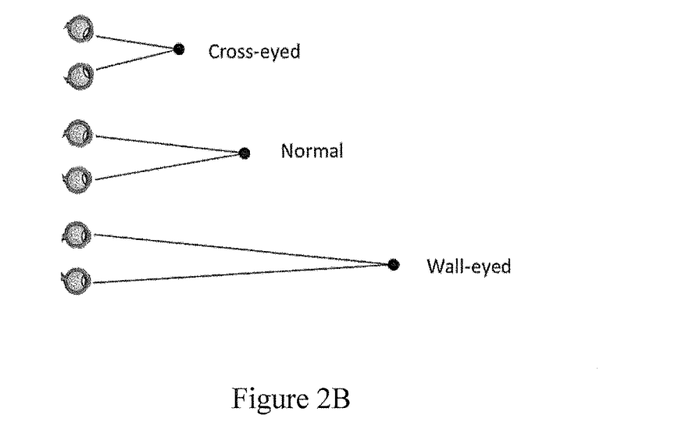
FIG. 2B is a descriptive illustration showing vergence movements in accordance with an embodiment of the present invention.
Figure 2C:
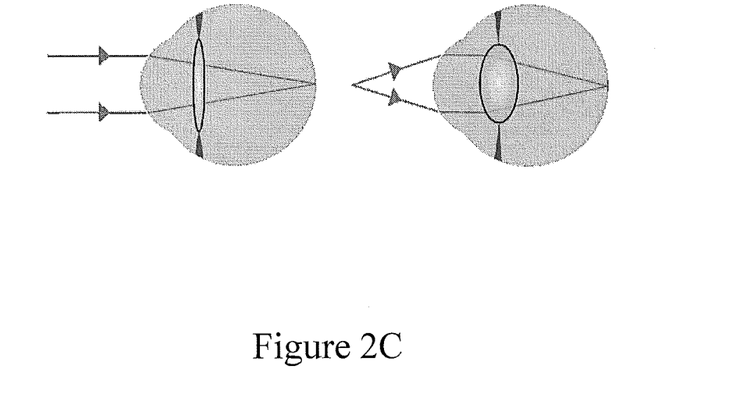
FIG. 2C is a descriptive illustration showing the accommodation process in accordance with an embodiment of the present invention.

The vergence is the simultaneous movement of both eyes in opposite directions to obtain (or maintain) binocular vision. The two eyes converge to point at the same object as illustrated on FIG. 2B. When a person with binocular vision looks at an object, the eyes typically rotate around a vertical axis so that the image projection is at the center of the retinas. To look at an object located closer by, the eyes rotate towards each other (convergence), while for an object located farther away, the eyes rotate away from each other (divergence). Exaggerated convergence is also known as cross-eyed viewing as shown in FIG. 2. When looking into the distance, the eyes diverge until parallel, effectively fixating the same point at infinity Finally, accommodation is the process by which the lens changes its curvature to maintain a clear image (focus) on an object as its distance from the eye changes (see FIG. 2C). Vergence movements are closely connected to accommodation. Under normal conditions, changing the focus of the eyes to look at an object at a different distance typically involves vergence and accommodation.

Figure 3:
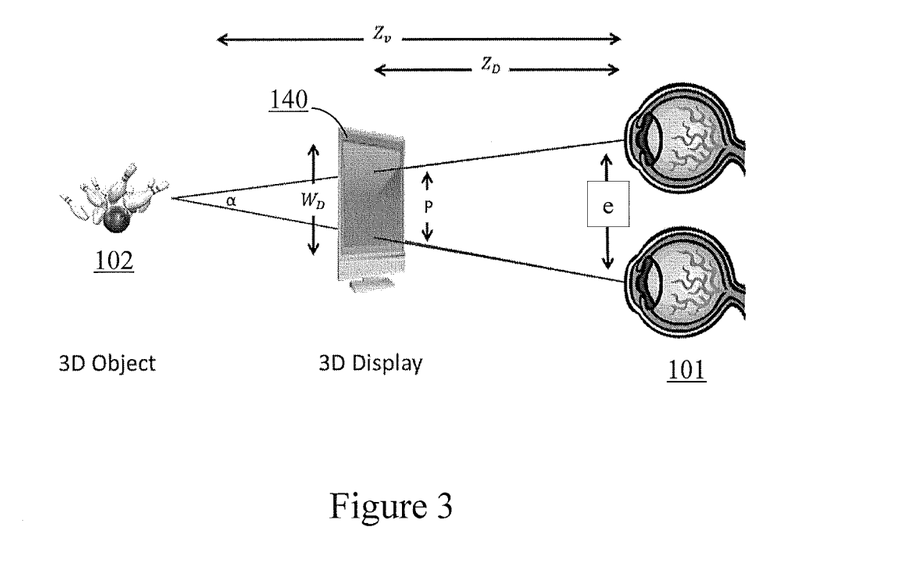
FIG. 3 is a descriptive illustration showing the stereoscopic parameters in accordance with an embodiment of the present invention.

Reference is now made to FIG. 3, which is a pictorial illustration showing the stereoscopic parameters in accordance with an embodiment of the present invention.

In FIG. 3, a user 101 is shown located at a viewing distance $Z_d$ in front of the display device 140. For this user 101, a 3D object 102 with a horizontal parallax (pixel offset) P is perceived at depth $Z_v$. This depth $Z_v$ is given by the following equation:

$$Z_v = \frac{e \cdot Z_d}{e - P}$$

where, e is the user's intra-ocular distance.

As it is apparent from the previous equation, $Z_v = Z_d$ at the ZAPS. In this situation, all objects—including the 3D object 102—appear at the screen plane. Furthermore, objects with a positive horizontal parallax value P appear in the space behind the screen ($Z_v > Z_d$). On the contrary, objects with a negative horizontal parallax value P appear in the space in front of the screen ($Z_v < Z_d$). Thus, the depth budget ($\Delta P$)—being a combination of the maximum positive and negative horizontal parallax values—is given by:

$$\Delta P = P_{max} - P_{min} = e \cdot Z_d \cdot \left( \frac{1}{Z_{v_{near}}} - \frac{1}{Z_{v_{far}}} \right)$$

where, $Z_{v_{near}}$ denotes the perceived depth of an object near to the user 102 and $Z_{v_{far}}$ denotes the perceived depth of an object far from the user 102.

Additionally, the common definition of the parallax angle under which the optical rays of two eyes intersect at a particular point in the 3D space is given by:

$$\Delta \alpha = \tan^{-1}\left( \frac{e}{Z_v} \right)$$

Therefore, the maximum angular disparity can be defined as follows:

$$\Delta \alpha_{max} = \tan^{-1}\left( \frac{e}{Z_{v_{near}}} \right) - \tan^{-1}\left( \frac{e}{Z_{v_{far}}} \right) \approx e \cdot \left( \frac{1}{Z_{v_{near}}} - \frac{1}{Z_{v_{far}}} \right)$$

where $\Delta \alpha_{max}$ denotes the maximal parallax angle between near and far objects which enables a distortion-free fusing of stereoscopic images.

Thus, the maximal parallax angle allowed by a stereoscopic 3D display device may be obtained by:

$$\Delta P_{max} \approx Z_d \cdot \Delta \alpha_{max}$$

Finally, normalizing the maximal parallax range $\Delta P_{max}$ to the display width $W_D$ results in a relative parallax range $\Delta P_{rel}$ that depends on the particular screen size:

$$\Delta P_{rel} = \frac{\Delta P_{max}}{W_D} = \frac{Z_d}{W_D} \cdot \Delta \alpha_{max}$$

This relation shows that, apart from the physical viewing conditions represented by the ratio $$\frac{Z_d}{W_D},$$

ΔP$_{rel}$ mainly depends on a psycho-optical component where Δα$_{max}$ describes the maximal parallax at which the stereo images can be fused without visible distortions.

The literature provides different thumb rules for choosing an appropriate parallax range. One established thumb rule is to set Δα$_{max}$ to a value of 0.02. This assumption represents a conservative estimate as well as a simple and safe production rule. Therefore, this estimate is usually used when the stereoscopic images are produced/processed. For theater/cinema stereo projection with medium screen size and viewing distance, it is usual to take a standard ratio $$\frac{Z_d}{W_D}$$

of 1.67 Hence, it is possible to deduce a related thumb rule for the relative parallax range ΔP$_{rel}$:

$$\Delta P_{rel} = \frac{\Delta P_{max}}{W_D} = \frac{0.02}{0.6} = \frac{1}{30}$$

For theater/cinema projections, home environments and flat-screen 3D displays, the ratio $$\frac{Z_d}{W_D}$$

may vary considerably in a range from 1.00 to 4.00. The resulting range of ΔP$_{rel}$ is between 1/50 and 1/12.

From the first equation giving the depth $Z_v$, it is understood that the depth reproduction is not necessarily linear. The depth reproduction is linear in a situation where the display setup is such that infinity parallax equals the intra-ocular distance e. Otherwise, stereoscopic distortions appear such that foreground scene elements are more elongated than background scene elements, or vice versa.

Figure 4A:
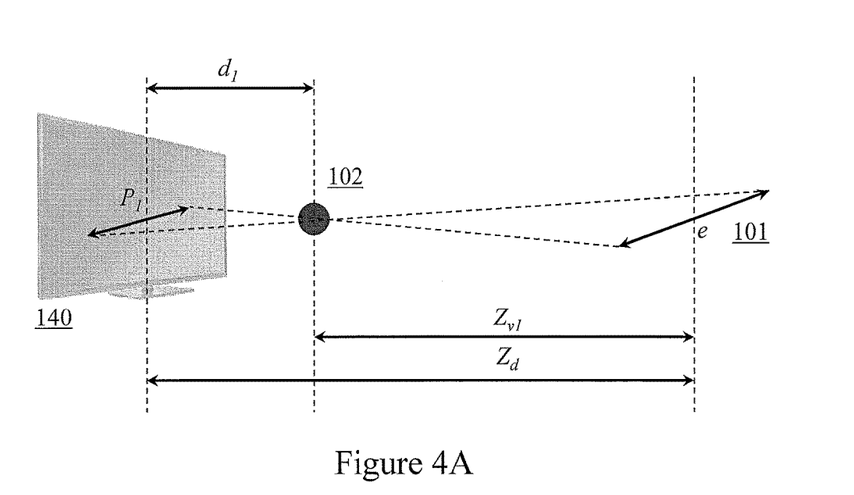
FIGS. 4A and 4B are pictorial illustrations showing a calibration procedure in accordance with an embodiment of the present invention.
Figure 4B:
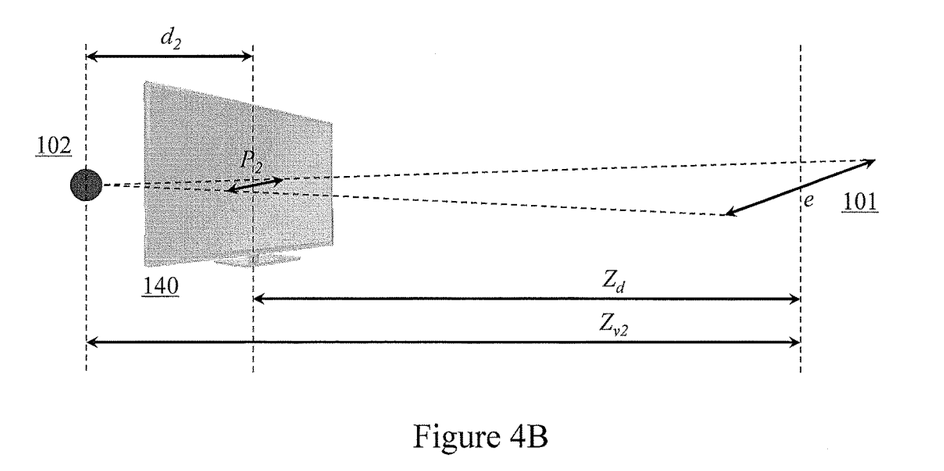

Reference is now made to FIGS. 4A and 4B, which are pictorial illustrations showing a calibration operation in accordance with an embodiment of the present invention.

In an embodiment of the present invention, a user standing at a particular viewing position (e.g. in front of his 3D-TV system 100 at a viewing distance $Z_d$) may launch a calibration application as explained hereinabove. Once launched, the application typically shows a test pattern enabling the user 101 to calibrate the stereoscopic 3D effect. The test patterns comprises first (e.g. Left) and second (e.g. Right) images (not shown) of a stereoscopic image having depth characteristics associated with the pixel offset between the first (e.g. Left) and second (e.g. Right) images. Typically, the test patterns show an object 102 such as, for example, but without limiting the generality of the invention, a ball (as illustrated in FIGS. 4A and 4B) that is to be rendered at several pre-defined positions. Typically, the user 101, standing in front of the display device screen 140, is requested to position the object 102 at a perceived distance d$_1$ (object 102 perceived in front of the display screen 140 as shown in FIG. 4A) and then, at a perceived distance d$_2$ (object 102 perceived behind the display screen 140 as shown in FIG. 4b), or vice versa where:

$$Z_{v_1} = Z_d - d_1; \text{ and}$$

$$Z_{v_2} = Z_d + d_2$$

Those skilled in the art will appreciate that the perceived distances at which the user 101 is asked to position the object 102 may be any suitable distance enabling a stereoscopic calibration without any stereoscopic distortions. The calibration application may also be configured so that the user 101 is able to position the object 102 at a plurality of perceived distances such as, but not limited to, the object 102 appearing on the plane of the display screen 140, the object appearing at infinite (i.e. at a maximum distance for which the object can be seen behind the screen without stereoscopic distortions), or as close as possible to the user 101 (i.e. at a maximum distance for which the object can be seen in front of the screen without stereoscopic distortions). The user 101 typically positions the object 102 using relevant keys on a RCU 150 thereby adjusting the pixel offset between the first (e.g. Left) and second (e.g. Right) images of the stereoscopic image. Positioning the object 102 at different perceived distances through the calibration application enables the calculation of an average adjusted pixel offset customized according to the user's current viewing position (e.g. viewing distance $Z_d$—distance between the user 101 and the display screen 140—and angular position); and physical characteristics (e.g. intra-ocular distance e). The average adjusted pixel offset is typically obtained by calculating the average value of the adjusted pixel offset values corresponding to the several pre-defined positions at which the object 102 is to be rendered during the calibration. Then, the average adjusted pixel offset is stored on a storage device of the client device 120 to be applied later to the stereoscopic images of the 3D image stream. Typically, the left and right images of the 3D image stream are shifted by the value of the average adjusted pixel offset for display.

The following example will illustrate that a simple pixel offset of the stereoscopic images enables recalibrating the stereoscopic 3D effect. Indeed, all the depth characteristics are impacted by a simple pixel offset of the stereoscopic images. In this example, a user 101 wanting to calibrate his 3D-TV system 100 launches the calibration application. The user 101 is then asked to position an object 102 at a perceived distance d$_1$ of 25 cm in front of the display screen 140 and then, at a perceived distance d$_2$ of 25 cm behind the display screen 140. Therefore:

$$Z_{v_1} + 25 = Z_d; \text{ and}$$

$$Z_{v_2} = Z_d + 25$$

To position the object 102 at perceived distance d$_1$ in front of the display screen 140, the user 101 uses a RCU 150 and typically adjusts the pixel offset between the left and right images of the stereoscopic image. Therefore, the horizontal parallax P$_1$ can be derived using the following equation:

$$P_1 = \text{pixel\_offset} \cdot \text{pixel\_size}$$

The pixel size depends on the display screen size (e.g. usually given as a diagonal measurement by TV manufacturers, i.e. the distance between two diagonally opposite screen corners), the aspect ratio and the screen resolution, and all of these are provided to the calibration application as known configuration parameters. In the present example, the calculations are performed based on the following configuration parameters of the display screen 140:

diagonal: 42 inches or 106.68 cm;
aspect ratio: 16:9; and
screen resolution: 1920×1080.

It will be apparent to someone skilled in the art that the parameters given hereinabove are not limiting and therefore that the present invention, in embodiments thereof, works with any display screen size, aspect ratio and resolution. With these parameters, the pixel size is 0.0445 cm and positioning the object 102 at $d_1$=25 cm in front of the display screen 140 (as shown in FIG. 4A) corresponds to a pixel offset between the left and right images of the stereoscopic image of −30 pixels. Similarly, positioning the object 102 at $d_2$=25 cm behind the display screen 140 (as shown in FIG. 4B) corresponds to a pixel offset of +21 pixels. Therefore, the horizontal parallax $P_1$ and $P_2$ can be calculated:

$P_1$=−1.335 cm and $P_2$=0.9345 cm

It is also recalled that the generic viewing distance for a user 101 is given by:

$$Z_v = \frac{e \cdot Z_d}{e - P}$$

as described above in relation to FIG. 3.
Thus:

$$Z_{v_1} = \frac{e \cdot Z_d}{e - P_1}$$

with $Z_{v_1}$=$Z_d$−25 and $$Z_{v_2} = \frac{e \cdot Z_d}{e - P_2}$$

with $Z_{v_2}$=$Z_d$+25

By combining these equations, it is therefore possible to calculate the viewing distance $Z_d$, the distances $Z_{v_1}$ and $Z_{v_2}$ from the user 101 at which the objects 102 are subsequently positioned, and the user's intra-ocular distance e:

$Z_d$=141.67 cm $Z_{v_1}$=116.67 cm $Z_{v_2}$=166.67 cm; and e=6.23 cm

The 3D-TV calibration system 100 provides an improved 3D experience to the user 101 while keeping the calibration procedure as simple as possible. This 3D-TV calibration also provides a customized 3D experience by taking the viewing conditions and the audience characteristics of a particular household into consideration.

For the sake of illustration, table 1 below gives the different values of the parameters for a user's intra-ocular distance e=6.6 cm positioning an object at a distance d=25 cm behind the screen.

TABLE 1

| Viewing distance $Z_d$ (cm) | | | | 150 | 200 | 250 | 300 |
|---|---|---|---|---|---|---|---|
| Object distance $Z_v$ (cm) | | | | 175 | 225 | 275 | 325 |
| Diagonal (inch) | Diagonal (cm) | Width (cm) | Pixel size (cm) | — | — | — | — |
| 42 | 106.68 | 85.34 | 0.0445 | 21 | 16 | 13 | 11 |
| 46 | 116.84 | 93.47 | 0.0487 | 19 | 15 | 12 | 10 |
| 50 | 127.00 | 101.60 | 0.0529 | 18 | 14 | 11 | 10 |
| 55 | 139.70 | 111.76 | 0.0582 | 16 | 13 | 10 | 9 |

Figure 5:
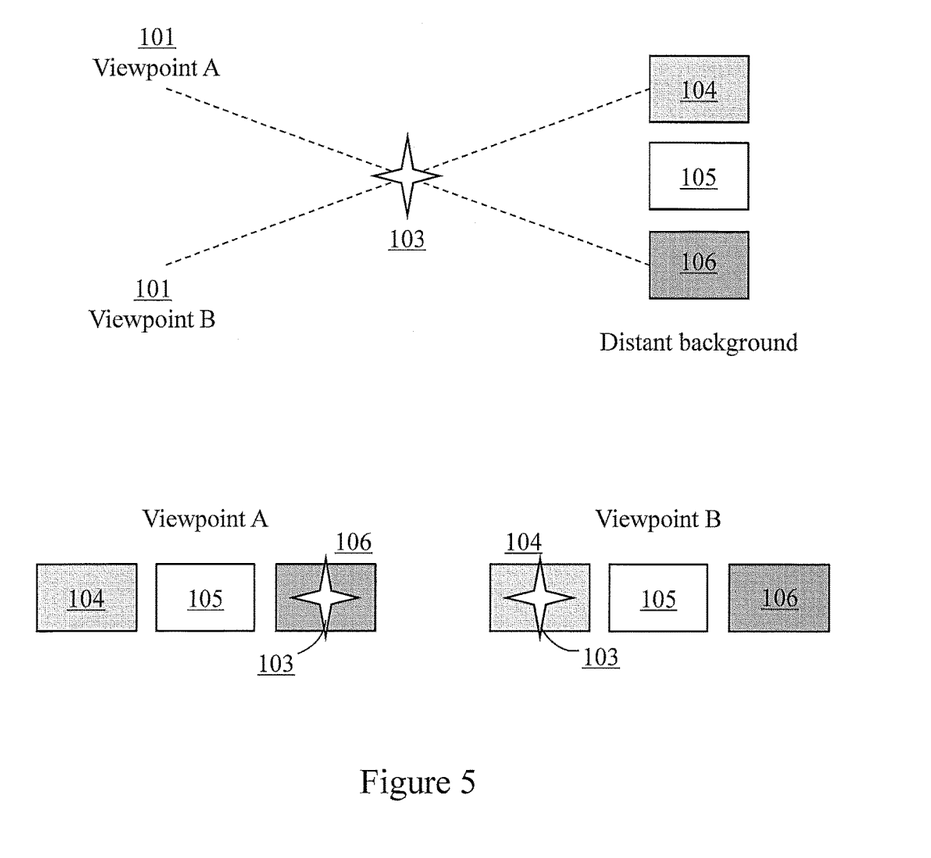
FIG. 5 is a pictorial illustration of a calibration procedure in accordance with another embodiment of the present invention.

Reference is now made to FIG. 5 which is a pictorial illustration of a calibration procedure in accordance with another embodiment of the present invention.

At home, a user 101 may watch TV from many different positions in his living room. Typically, the user 101 may not be located directly in front of the display screen 140 while watching TV. Therefore, in another embodiment of the present invention, the calibration application enables the user 101 to calibrate his 3D-TV system 100 to take into consideration further viewing positions. In this case, the stereoscopic 3D effect can be calibrated for different angular viewing positions. To do so, the calibration application typically shows a further test pattern customized for calibrating the angular viewing positions. The further test pattern comprises left and right images of a stereoscopic image showing a plurality of objects 103, 104, 105 and 106 at different perceived depths. As shown in FIG. 5, the user 101 is first asked to sit at a first viewing position (e.g. viewpoint A) and align a first object 103 perceived at a first depth (e.g. a star) with a second object 106 perceived at a second depth (e.g. dark grey box). Then, the user 101 is asked to sit at a second viewing position (e.g. viewpoint B) and align a first object 103 perceived at a first depth (e.g. a star) with a second object 104 perceived at a second depth (e.g. light grey box). Additionally and/or alternatively, the first and second viewing positions may be the extreme viewing positions (i.e. the maximum angular positions on the left and right sides of the display device screen 140) in the household from which the user may be able to watch TV without stereoscopic distortions. Again, the user 101 typically uses a RCU 150 to do this and in turn, an adjusted pixel offset value is obtained for each angular viewing position. Then, these further values may be used in relation to the ones obtained from the first test pattern to calculate the average adjusted offset value prior to storing it on the storage device of the client device 120. Additionally and/or alternatively, the user 101 may be asked to center vertically the first object 103 perceived at a first depth with the second objects 104-106 perceived at a second depth thereby adjusting the vertical parallax.

According to embodiments of the present invention, the calibration application is able to store the adjusted pixel offset values and/or the average adjusted pixel offset values calculated during the different calibration procedures described in relation to FIGS. 4A, 4B and 5 with identification data relevant to the user (101) who used the calibration application. This identification data typically identifies a particular user and/or type/category of user. This identification data may be requested by the calibration application during the calibration procedure and may be in any suitable form. For example, the user 101 may enter or be requested to enter a name, a surname, a user name, etc. as identification data for a particular user and/or a category such as, for example but without limiting the generality of the invention, adult, teenager, child, etc. as identification data for a type of user. The calibration application is then able to generate different profiles using the stored adjusted pixel offset values and/or the average adjusted pixel offset values corresponding to different users and viewing positions using the identification data. For example, a user 101 may calibrate his 3D-TV system 100 for different viewing positions and indicates 'user1' as identification data. Therefore, the calibration application may generate several profiles and/or sub-profiles for the same user 101:

(offset_value1; user1_profile1) for viewing position 1 (at viewing distance $Z_{d_1}$ in front of the screen for example);

(offset_value2; user1_profile2) for viewing position 2 (at viewing distance $Z_{d_2}$ in front of the screen);

(offset_value3; user1_profile3) for viewing position 3 (at viewing distance $Z_{d_3}$ not in front of the screen i.e. at angular position $\alpha_3$);

(offset_value4; user1_profile4) for viewing position 4 (at viewing distance $Z_{d_4}$ not in front of the screen i.e. at angular position $\alpha_4$);

etc.

Additionally and/or alternatively, a user 101 may calibrate his 3D-TV system 100 for different viewing positions and indicates 'adult' as identification data. Therefore, the calibration application may generate several profiles and/or sub-profiles for this type of user:

(offset_value1; adult_profile1) for viewing position 1 (at viewing distance $Z_{d_1}$ in front of the screen for example);

(offset_value2; adult_profile2) for viewing position 2 (at viewing distance $Z_{d_2}$ in front of the screen);

(offset_value3; adult_profile3) for viewing position 3 (at viewing distance $Z_{d_3}$ not in front of the screen i.e. at angular position $\alpha_3$);

(offset_value4; adult_profile4) for viewing position 4 (at viewing distance $Z_{d_4}$ not in front of the screen i.e. at angular position $\alpha_4$);

etc.

Therefore, the user 101 does not have to calibrate the stereoscopic effect rendered by his 3D-TV system 100 each time he is watching his display device 140. Rather, when a user 101 starts watching TV, he is able to select a profile relevant to his current viewing position. Then, when the client device 120 receives and subsequently processes a 3D image stream, the calculated adjusted pixel offset values or the average adjusted pixel offset values stored in the storage of client device 120 associated with the selected profile may be retrieved and applied to the 3D image stream. Typically, the left and right images of the 3D image stream are shifted by the value of the retrieved calculated adjusted pixel offset or the retrieved average adjusted pixel offset for display.

Also, a household typically comprises different types of users. Typically, a household may, for example, comprise a man, a woman and a child, each of them having different TV viewing habits, viewing positions and intra-ocular distances. In such a situation, each viewer is able to calibrate the 3D-TV system 100 using the calibration application. Therefore, the stereoscopic 3D effect may be calibrated for different types of users and viewing positions. As explained hereinabove in the present specification, the calibration application may store the different users' (sub-)profiles and use them when requested.

In a further embodiment of the present invention, the calibration application is further able to generate, automatically or on a per user request, and store additional profiles corresponding to different types of audiences using identification data relevant to the type of users. This is particularly useful in situations where different types of users are watching TV together from different viewing positions. The calibration application is typically able to use the adjusted pixel offset values and/or average adjusted pixel offset values to generate audience profiles. Many different types of audience profiles may be generated. For example, but without limiting the generality of the present invention, the calibration application may generate an audience profile using at least two of the stored users' profiles; and/or using all of the stored users' profiles; and/or may generate an audience profile for adults using the users' profiles corresponding to adults users; and/or an audience profile for children using the users' profiles corresponding to children users; and/or a mixed audience profile combining adults and children users' profiles.

For sake of illustration and clarity, non-limiting examples are given hereinbelow and describe how different audience profiles for a particular household may be generated. In one embodiment of the present invention, a household comprises n adults and m children. Different users' profiles corresponding to the household's audience are available and the calibration application determined that:

the average of the average adjusted pixel offset values (adults_offset) for the n adults is given by:

$$\text{adults\_offset}_n = \frac{\sum_{i=1}^{n} \text{average\_adjusted\_offset}}{n}$$

Similarly, the average of the average adjusted pixel offset values (child_offset) for the m children is given by:

$$\text{children\_offset}_m = \frac{\sum_{i=1}^{m} \text{average\_adjusted\_offset}}{m}$$

Using these parameters, the calibration application may generate a plurality of additional audience profiles corresponding to:

a mixed audience profile typically well-suited in contexts where n=m or where n and m have a similar/close value. Such a mixed audience profile is useful in these examples since it gives a same importance to different categories of users. However, those skilled in the art will appreciate that these are non-limiting examples and that other ways of generating a mixed audience profiles are possible (e.g. generating mixed audience profiles for more than two categories of users for instance). Therefore, the average pixel offset value (mixed_audience1) used is given by:

$$\text{mixed\_audience1} = \frac{\text{adults\_offset}_n + \text{children\_offset}_m}{2}$$

a children-oriented audience profile typically well-suited in contexts where n<m. Therefore, the average pixel offset value (children_audience2) used is given by:

children_audience2=¼·adults_offset$_n$+¾·children_offset$_m$ an adult-oriented audience profile typically well-suited in contexts where n>m. Therefore, the average pixel offset value (adults_audience3) used is given by:

adults_audience3=¾·adults_offset$_n$+¼·children_offset$_m$

Those skilled in the art will appreciate that the coefficients ½, ¼ and ¾ are not limiting and that the calibration application may use any suitable coefficient or method to generate mixed audience profiles and/or various additional audience profiles giving more prominence to one or more category of users. Similarly, it will be appreciated by those skilled in the art that the generation of audience profiles is not limited to two categories of users (as shown in the example hereinabove). On the contrary, the calibration application is able to generate a plurality of additional audience profiles for more than two categories of users.

Therefore, when a user 101 starts watching TV, he may be able to select a profile relevant to the current audience. Then, when the client device 120 receives and subsequently processes a 3D image stream, the calculated average pixel offset values stored in the storage of client device 120 associated with the selected audience profile may be retrieved and applied to the 3D image stream. Typically, the left and right images of the 3D image stream are shifted by the value of the retrieved calculated adjusted pixel offset for display.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

Also, it will be appreciated by persons skilled in the art that the present invention is not limited to what has been particularly shown and described hereinabove. Rather the scope of the invention is defined by the appended claims and equivalents thereof.

The invention claimed is:

1. A method comprising:
   displaying a three dimensional test pattern on a display device associated with a client device, said test pattern comprising a stereoscopic image having first and second images and depth characteristics associated with an offset between said first and second images, wherein said stereoscopic image represents an object;
   adjusting said offset between said first and second images in response to inputs received from a user of said client device viewing said stereoscopic image from a viewing position relative to a screen of said display device, wherein said adjusting includes:
      adjusting a first offset between said first and second images in response to inputs received from said user viewing said stereoscopic image and positioning said object at a first perceived distance from said screen of said display device, and
      adjusting a second offset between said first and second images in response to inputs received from said user viewing said stereoscopic image and positioning said object at a second perceived distance from said screen of said display device;
   calculating an adjusted offset, customized at least for when the user is positioned at said viewing position, by averaging at least said first and second adjusted offsets; and
   storing said adjusted offset in a storage device, enabling said adjusted offset to be applied to stereoscopic images of a three dimensional image stream, at a time of display to the user.

2. The method of claim 1, wherein said first perceived distance is a distance for which said object is perceived by said user in front of said screen of said display device, and said second perceived distance is a distance for which said object is perceived by said user behind said screen of said display device.

3. The method of claim 1, wherein said first perceived distance is a maximum distance for which said object is perceived by said user in front of said screen of said display device without stereoscopic distortions, and said second perceived distance is a maximum distance for which said object is perceived by said user behind said screen of said display device without stereoscopic distortions; or vice versa.

4. The method of claim 1, further comprising:
   displaying a further test pattern comprising a further stereoscopic image having further first and second images and depth characteristics associated with a further offset between said further first and second images, said further stereoscopic image representing a plurality of further objects;
   adjusting a third offset between said further first and second images in response to inputs received from a user viewing said further stereoscopic image at a first angular viewing position relative to said screen of said display device and aligning a first further object perceived at a first depth with a second further object perceived at a second depth; and
   adjusting a fourth offset between said further first and second images in response to inputs received from a user viewing said further stereoscopic image at a second angular viewing position relative to said screen of said display device and aligning said first further object perceived at said first depth with a third further object perceived at said second depth, wherein said calculating includes:
      calculating the adjusted offset, customized for when the user is positioned at any of a plurality of viewing positions, by averaging at least said first, second, third and fourth offsets.

5. The method of claim 4, wherein said first angular viewing position is a maximum angular viewing position on the left of said screen of said display device from which said object is perceived by said user without stereoscopic distortions, and said second angular viewing position is a maximum angular viewing position on the right of said screen of said display device from which said object is perceived by said user without stereoscopic distortions.

6. A system comprising:
   a display device associated to a client device, said display device being operable to display a test pattern comprising a stereoscopic image having first and second images and depth characteristics associated with an offset between said first and second images, wherein said stereoscopic image represents an object;
   a client device operable to adjust said offset between said first and second images in response to inputs received from a user of the client device viewing said stereoscopic image from a viewing position relative to a screen of said display device, wherein said operable to adjust includes:
      operable to adjust a first offset between said first and second images in response to inputs received from said user viewing said stereoscopic image and positioning said object at a first perceived distance from said screen of said display device, and
      operable to adjust a second offset between said first and second images in response to inputs received from said user viewing said stereoscopic image and positioning said object at a second perceived distance from said screen of said display device,
      the client device further operable to calculate an adjusted offset, customized at least for when the user is positioned at said viewing position, by averaging at least said first and second adjusted offsets; and
   a storage device operable to store said adjusted offset, wherein said client device is further operable to apply said adjusted offset to stereoscopic images of a three dimensional image stream, at a time of display to the user by the display device.

7. One or more non-transitory computer readable tangible storage media encoded with software comprising computer executable instructions and when the software is executed operable to:
  display a test pattern comprising a stereoscopic image having first and second images and depth characteristics associated with an offset between said first and second images, wherein said stereoscopic image represents an object;
  adjust said offset between said first and second images in response to inputs received from a user viewing said stereoscopic image from a viewing position relative to a screen, wherein said adjust includes:
    adjust a first offset between said first and second images in response to inputs received from said user viewing said stereoscopic image and positioning said object at a first perceived distance from said screen, and
    adjust a second offset between said first and second images in response to inputs received from said user viewing said stereoscopic image and positioning said object at a second perceived distance from said screen,
  calculate an adjusted offset, customized at least for when the user is positioned at said viewing position, by averaging at least said first and second adjusted offsets; and
  store said adjusted offset, so that said adjusted offset can be applied to stereoscopic images of a three dimensional image stream, at a time of display to the user.

* * * * *

UNITED STATES PATENT AND TRADEMARK OFFICE
CERTIFICATE OF CORRECTION

PATENT NO. : 9,667,951 B2  
APPLICATION NO. : 14/182671  
DATED : May 30, 2017  
INVENTOR(S) : Thierry Gruszka et al.

Page 1 of 1

It is certified that error appears in the above-identified patent and that said Letters Patent is hereby corrected as shown below:

In the Specification

Column 5, Line 9 approx., "Adults," to read as --adults,--.

Column 5, Line 37, "(ZAPS);" to read as --(ZPS);--.

Column 5, Line 57, "infinity" to read as --infinity.--.

Column 6, Line 13 approx., "ZAPS." to read as --ZPS.--.

Column 7, Line 18 approx., "1.67" to read as --1.67.--.

Column 9, Line 27 approx., "25" to read as --25;--.

Column 9, Line 38 approx., "cm" to read as --cm;--.

Column 9, Line 39 approx., "cm" to read as --cm;--.

Column 9, Line 44 approx., "cm" to read as --cm.--.

In the Claims

Column 13, Line 63, Claim 3, "claim 1," to read as --claim 2,--.

Signed and Sealed this  
Eighteenth Day of July, 2017

Joseph Matal  
*Performing the Functions and Duties of the*  
*Under Secretary of Commerce for Intellectual Property and*  
*Director of the United States Patent and Trademark Office*